(12) United States Patent
Ferrier

(10) Patent No.: US 6,744,863 B2
(45) Date of Patent: Jun. 1, 2004

(54) INTERNET/TELEPHONE ACCESS DEVICE

(76) Inventor: Kirk J. Ferrier, 6 Seven Springs Rd., Lebanon, NJ (US) 08833

( * ) Notice: Subject to any disclaimer, the term of this patent is extended or adjusted under 35 U.S.C. 154(b) by 128 days.

(21) Appl. No.: 10/155,164

(22) Filed: May 23, 2002

(65) Prior Publication Data

US 2003/0219106 A1 Nov. 27, 2003

(51) Int. Cl.$^7$ .............................................. H04M 11/00
(52) U.S. Cl. ................................ 379/93.02; 379/93.05; 379/199; 379/188
(58) Field of Search .......................... 379/93.02, 93.03, 379/93.05, 93.17, 130, 131, 188, 190, 199

(56) References Cited

U.S. PATENT DOCUMENTS

| | | | |
|---|---|---|---|
| 3,801,745 A | 4/1974 | Zuckerman | 179/7.1 |
| 3,830,985 A | 8/1974 | Troemel | 179/81 |
| 4,511,765 A | 4/1985 | Kuo | 179/90 |
| 4,771,452 A | 9/1988 | Carlson | 379/190 |
| 5,062,134 A * | 10/1991 | Laird | 379/131 |
| 5,448,630 A * | 9/1995 | Barstow | 379/199 |
| 5,748,718 A * | 5/1998 | Manicone | 379/131 |
| 5,956,697 A | 9/1999 | Usui | 705/32 |
| 5,991,799 A | 11/1999 | Yen et al. | 709/218 |
| 6,011,840 A | 1/2000 | Cobb | 379/199 |
| 6,169,790 B1 * | 1/2001 | Flon | 379/131 |
| 6,246,756 B1 | 6/2001 | Borland et al. | 379/142 |

OTHER PUBLICATIONS

Pub. Patent Application, Jeffrey Box, Pub. Date: Sep. 12, 2002, Pub. No.: U.S. 2002/0129267 A1, Filed: Mar. 12, 2001.

Pub. Patent Application, Cassista et al., Pub. Date: Jan. 17, 2002, Pub. No.: U.S. 2002/0007459 A1, Filed Jul. 16, 2001.

Pub. Patent Application, William Goss, Pub. Date: Dec. 12, 2002, Pub. No.: U.S. 2002/0185917 A1, Filed: Jun. 8, 2001.

Pub. Patent Application, Mi et al., Pub. Date: Aug. 22, 2002, Pub. No.: U.S. 2002/0116616 A1, Filed: Apr. 12, 2002.

Pub. Patent Application, Nishikawa et al., Pub. Date: May 23, 2002, Pub. No.: U.S. 2002/0062365 A1, Filed: Jun. 13, 2001.

* cited by examiner

*Primary Examiner*—Stella Woo
(74) *Attorney, Agent, or Firm*—Walter J. Tencza, Jr.

(57) ABSTRACT

An telecommunications access device is disclosed which allows an administrator to set an amount of time per day that a user can access the Internet or use a telephone. The telecommunications access device may be permanently electrically connected to first and second telecommunications lines each of which may include a telephone cord and a plug. The first telecommunications line may be electrically connected to a port of a computer processor. The second telecommunications line may be electrically connected to a port of a telephone jack. The telecommunications access device may include a keypad, which allows the user to enter a user code, which permits the user to access, the Internet or use a telephone, if the amount of time has not expired. The telecommunications access device may include a display, which dynamically displays the amount of time that the user has remaining to access the Internet for a particular day.

13 Claims, 9 Drawing Sheets

Fig. 9
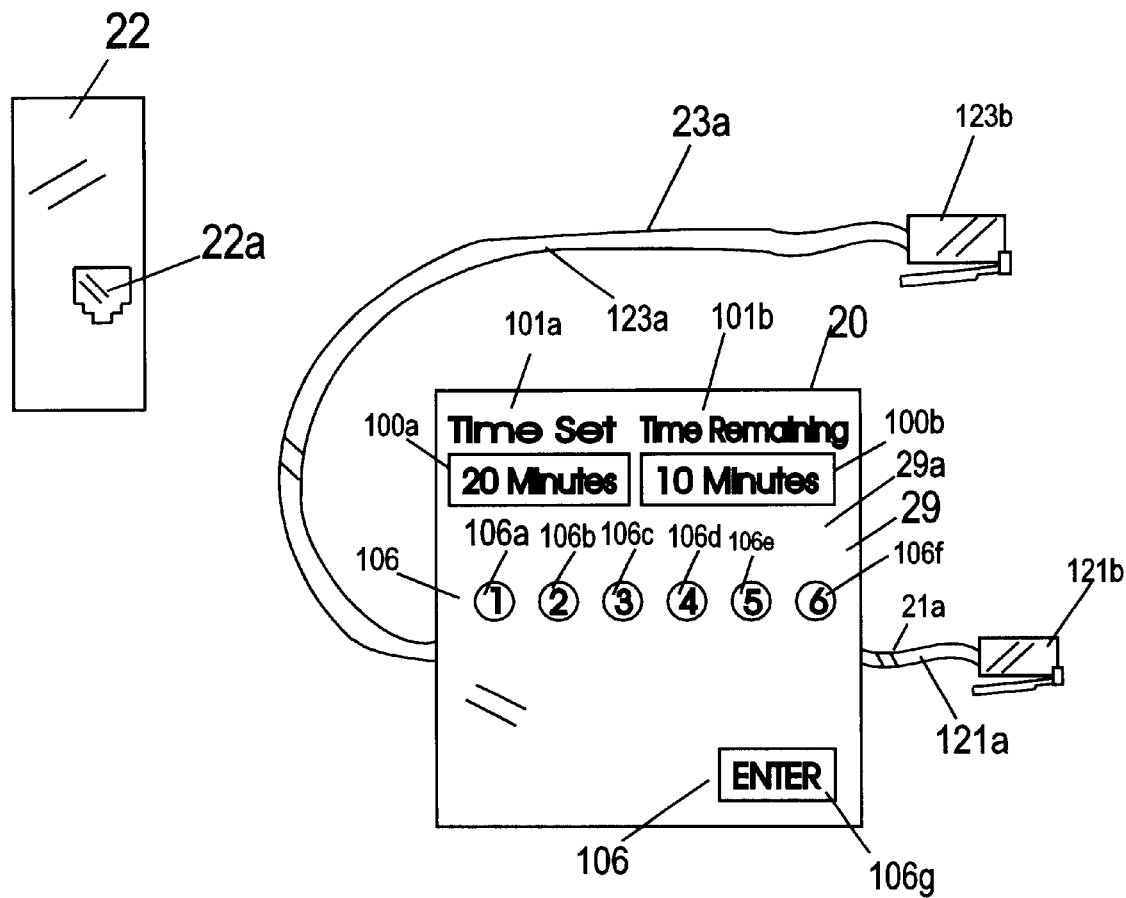
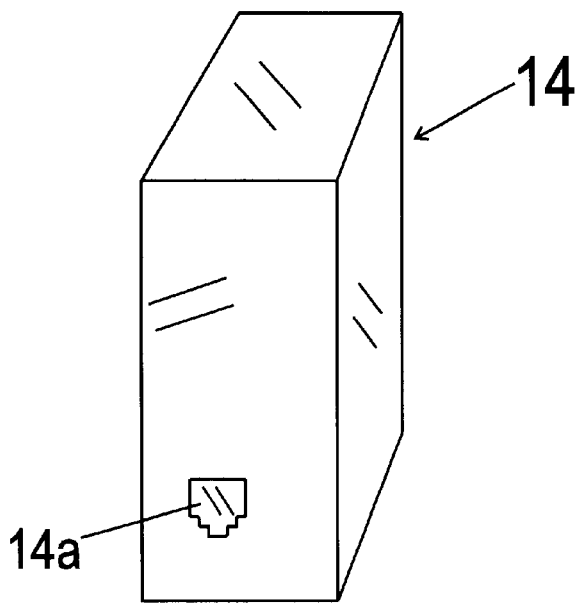

2

INTERNET/TELEPHONE ACCESS DEVICE

FIELD OF THE INVENTION

This invention relates to improved methods and apparatus of controlling when a user, such as a teenager accesses the Internet or a telephone.

BACKGROUND OF THE INVENTION

Typically in the prior art access to the Internet can be achieved by simply clicking on an icon such as a Windows Internet Explorer (TRADEMARKED) icon. A telephone is typically used by simply picking up a receiver and dialing a telephone number. A teenager may spend hours on the Internet or the telephone. There is a need to restrict such access.

SUMMARY OF THE INVENTION

The present invention in at least one embodiment allows a parent to limit the time a user, such as a teenager, spends on the Internet or on a telephone. In one form of the present invention an Internet access device or telecommunications access device is provided which allows an administrator (or parent) to set an amount of time per day that a user can access the Internet or use a telephone. The Internet access device can be the same as or can be termed a type of telecommunications access device.

The Internet access or telecommunications device may be permanently connected to two telecommunications lines, which may be two telephone cords. For the Internet case, one of the telecommunication lines may be electrically connected to a port of a computer processor and the other telecommunications line may be electrically connected to a port of an Internet port (such as a telephone jack). For the telephone case, one of the telecommunications lines may be electrically connected to a telephone base and one of the telecommunications lines may be electrically connected to a telephone handset.

The Internet access or telecommunications access device may include a keypad, which allows the user to enter a user code. The user code may permit the user to access the Internet or use a telephone, if an amount of time has not expired.

The Internet access device or telecommunications access device may include a display, which dynamically displays the amount of time that the user has remaining to access the Internet for a particular day. The Internet access or telecommunications access device may include a display, which displays the amount of time per day that the user has to access the Internet or use a telephone.

The present invention in various embodiments also discloses a method comprising steps setting an amount of time per day that a user can access the Internet or use a telephone. The amount of time per day may be set via an Internet access device or telecommunications access device that is permanently electrically connected to two telecommunication lines which may be telephone cords. For the Internet case, the first telecommunications line may be electrically connected to a port of a computer processor and the second telecommunications line may be electrically connected to a port of an Internet port, which may be a telephone communications jack. The method may include dynamically displaying the amount of time that the user has remaining to access the Internet for a particular day. The method may include displaying the amount of time per day that the user has to access the Internet.

BRIEF DESCRIPTION OF THE DRAWINGS

FIG. 9 shows portions of the apparatus of FIG. 1.

DETAILED DESCRIPTION OF THE DRAWINGS

Figure 1:
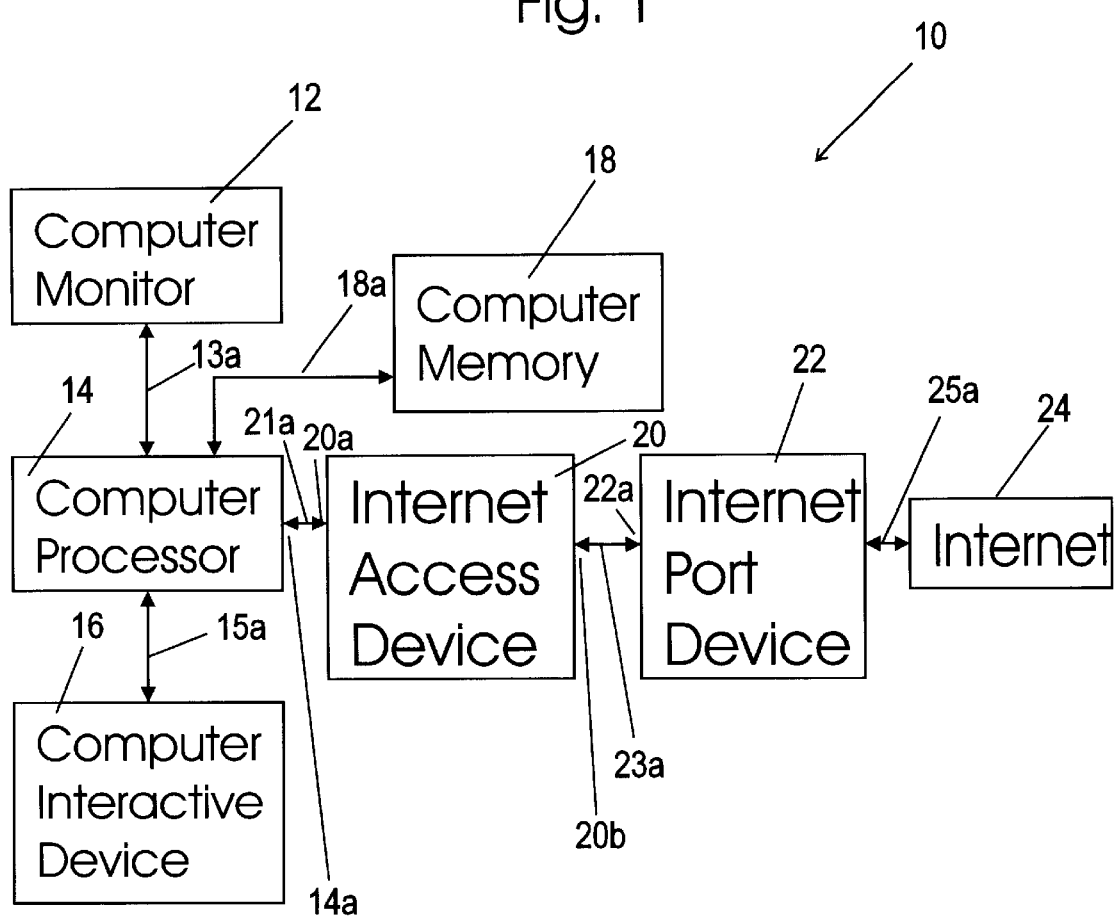
FIG. 1 shows a block diagram of an apparatus in accordance with a first embodiment of the present invention.

FIG. 1 shows a block diagram of an apparatus 10 in accordance with a first embodiment of the present invention. The apparatus 10 includes computer monitor 12, computer processor 14, computer interactive device 16, computer memory 18, Internet access device 20, Internet port device 22, and the Internet 24.

The computer processor 14 communicates with computer monitor 12 and computer interactive device 16 through communications lines or links 13a and 15a, respectively. The computer processor 14 communicates with computer memory 18 and Internet access device 20 through communications lines 18a and 21a respectively. The Internet access device 20 communicates with the Internet port device 22 through communications line 23a. The Internet port device 22 communicates with the Internet 24 through main communications line 25a. The computer processor 14 may have a telecommunications port 14a to which a first end of the communications line or link 21a is electrically connected. The Internet access device 20 may have a port 20a, which may be electrically connected to a second end of the communications line or link 21a. The Internet access device 20 may have a port 20b, which may be electrically connected to a first end of the communications line or link 23a. The second end of the communications line or link 23a may be electrically connected to a port 22a of the Internet port device 22.

The communications lines 13a, 15a, 18a, 21a, 23a, and main telecommunications line 25a may be comprised of one or more hardwired connections, electrical connections, optical connections, software connections, wireless connections, or any other known communications connections. The internet port device 22 may be a telephone jack. The communications line 21a may be connected to a personal computer telecommunications port 14a on computer processor 14. Computer interactive device 16 may be comprised of a keyboard, mouse, or any other computer interactive device.

In operation, an individual can use the computer interactive device 16 to click on an internet icon such as Windows Internet Explorer (Trademarked), which may be displayed on the computer monitor 12 by known computer software. However, in accordance with an embodiment of the present invention, the internet access device 20 will determine whether access to the internet is permitted.

Figure 2:
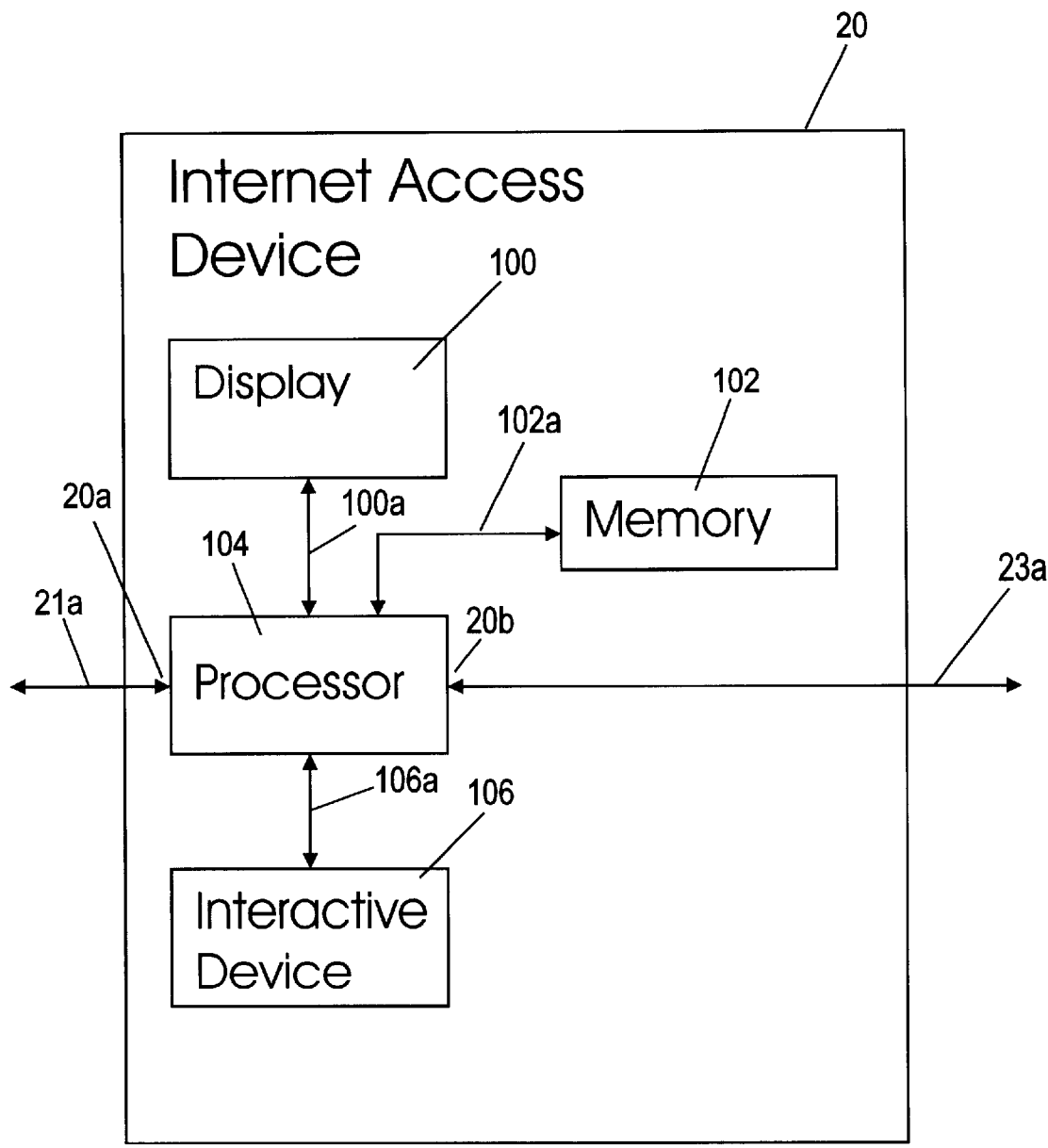
FIG. 2 shows a block diagram of an internet access device for use with the apparatus of FIG. 1.

FIG. 2 shows a block diagram of an internet access device 20 for use with the apparatus 10 of FIG. 1. The internet access device 20 includes a display 100, a memory 102, a processor 104, and an interactive device 106. The processor 104 communicates via communications lines or links 100a, 102a, and 106a with the display 100, memory 102, and the interactive device 106, respectively. The communications lines or links 100a, 102a, and 106a may be comprised of any suitable type of communications lines such as hardwired, electrical, software, optical, or wireless. FIG. 2 also shows communications lines 21a and 23a connected to ports 20a and 20b, respectively of the processor 104.

Figure 3:
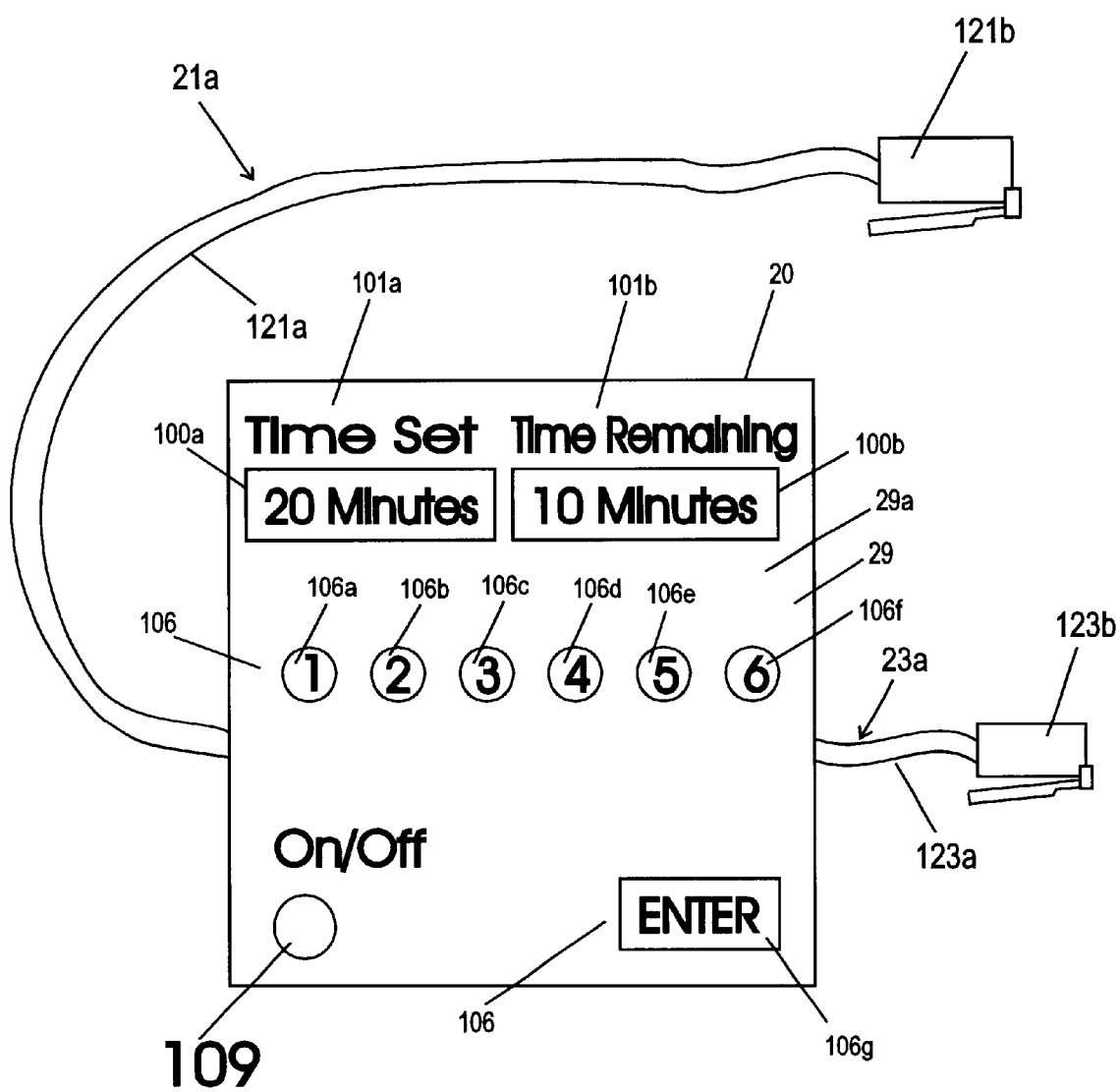
FIG. 3 shows components on a top surface of the Internet access device of FIG. 1, and two permanently connected telephone cords each ending in a plug.

FIG. 3 shows components on a top surface 29a of a housing 29 of the Internet access device 20 of FIG. 1. and telecommunications lines 21a and 23a. Although the telecommunications lines 21a and 23a can be of various types, the embodiment of FIG. 3 shows a telecommunication line 21a which includes a telephone cord 121a and a plug 121b and a telecommunication line 23a which includes a telephone cord 123a and a plug 123b. In the embodiment of FIG. 3 the telecommunications lines 21a and 23a are permanently connected to the Internet access device 20. The is advantageous so that, for example, a teenager cannot disconnect the internet access device 20, and simply plug the telecommunications line 21a directly into the internet port device 20 or plug the telecommunications line 23a directly into the computer processor 14.

FIG. 3 shows displays 100a and 100b, which may be part of display 100 of the Internet access device 20. FIG. 3 shows designations 101a for "Time Set" and 101b for "Time Remaining". Display 100a indicates the total amount of time for one day that a particular user will be allowed by the internet access device 20 to access the internet (barring a special exception). Display 100b indicates the time the particular user has remaining to access the internet for the particular day. Display 100b counts down dynamically while the particular user is accessing the internet.

FIG. 3 also shows buttons 106a, 106b, 106c, 106d, 106e, and 106f, which have the designations "1", "2", "3", "4", "5", and "6" respectively, printed on them. FIG. 3 also s enter button or key 106g. The buttons 106a–106g may be part of the interactive device 106 for entering information into the Internet access device 20.

Figure 4:
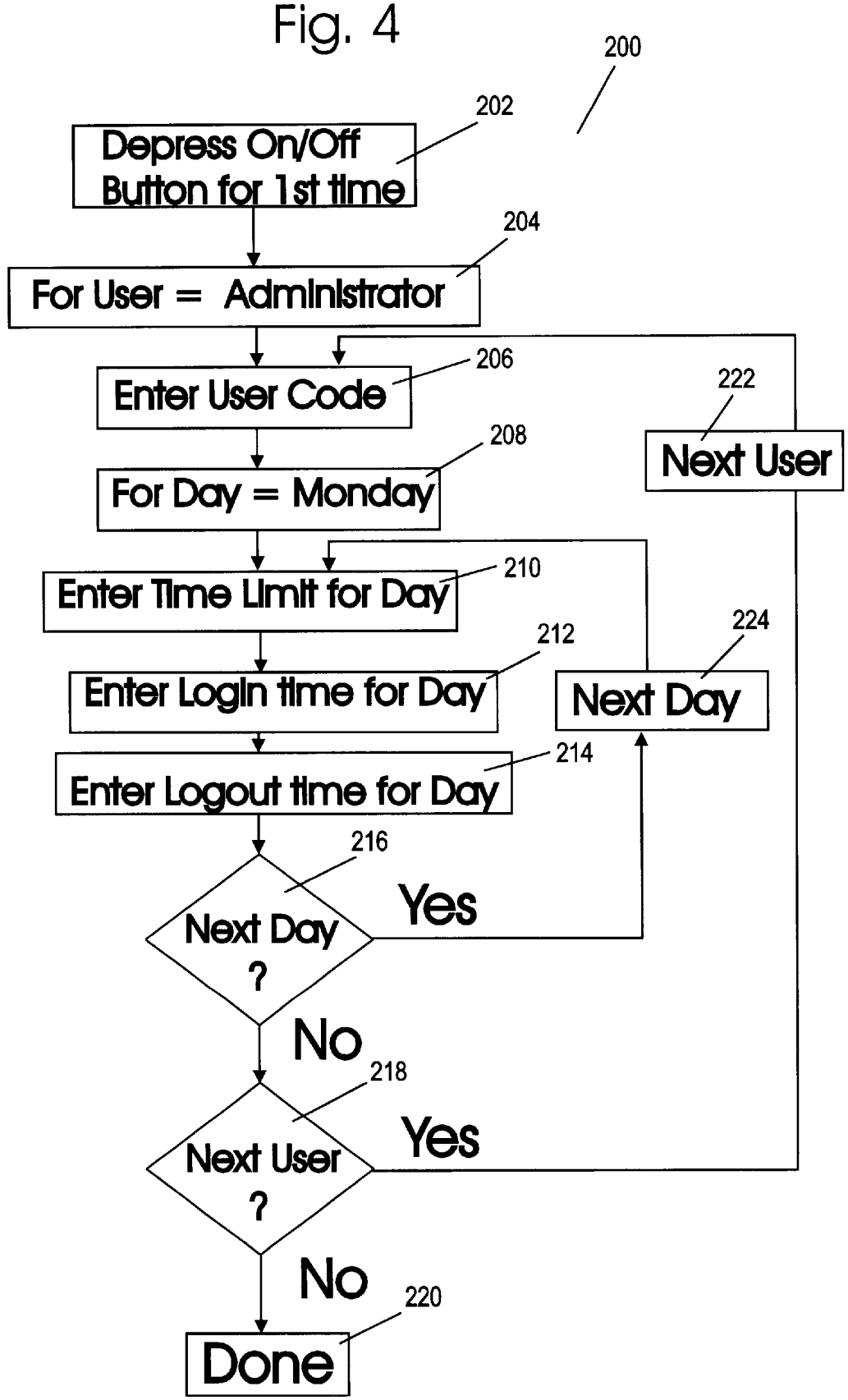
FIG. 4 shows a flow chart of a method for setting parameters for the Internet access device of FIG. 1.

FIG. 4 shows a flow chart 200 of a method for setting parameters for the Internet access device 20 of FIG. 1. At step 202 an on/off button, such as button 109 on the Internet access device 20, may be pressed for the first time to activate the Internet access device 20 for the first time. At step 204 the processor 104 of the Internet access device 20 begins processing for the situation where the user is the administrator of the Internet access device 20. The administrator may for example, be a parent of a teenager.

At step 206 the processor 104 may display a message on the display 100, such as 100a or 100b, asking the administrator for enter what will be the administrator code. The administrator code may also be referred to as the first user code. The administrator may then enter the first user (i.e. the administrator) code by pressing a series of the numbered keys 106a–106f, and then the enter key 106g. For example the administrator may enter "123" and then press "enter". The processor 104 of the Internet access device 20 may then store the code "123" into its memory 102 and associate the code "123" with the first user (i.e. the administrator).

At step 208 the processor 104 begins processing for Monday for the first user. The processor 104 at step 210 may display a message on the display 100, asking the first user to enter a total time limit for accessing the Internet for Monday. The first user may enter the time limit for Monday by pressing the appropriate series of the numbered keys 106a–106f and then the enter key 106g. For example, the first user may enter "20" and then hit enter to enter twenty minutes of Internet access time for Monday. At steps 212 and 214 the processor 104 may request via a displayed message on display 100 and receive via numbered keys 106a–f and enter key 106g, a login time for Monday and a logout time for Monday. For example, a first user may enter "900" for 9:00 a.m. as a login time and "1000" for 10:00 a.m. as a logout time for Monday.

The processor 104 of the Internet access device may determine at step 216 if it has already processed the last day of the week, such as Sunday in this example. If the processor 104 has not processed the last day of the week, then the next day, then the processor 104 begins processing on the next day, which in this case would be Tuesday, at step 224. Total time limit, login time, and logout time would be entered for Tuesday through Sunday in a similar manner as for Monday. When all the days of the week are processed for the first user, the processor 104 next begins processing for the second user at step 222. The administrator (i.e. first the user) sets the first user code, time limits, login and logout times for the second user and for any other further users. After processing is complete for each user, the processor 104 may display a message on display 100 at step 218 to determine whether the last user has been processed. The administrator may have to press some combination of keys of the keys 106a–106g to enter a further user or to end processing. When processing ends at step 220, all of the user codes, time limits, login and logout times have been set.

Figure 5:
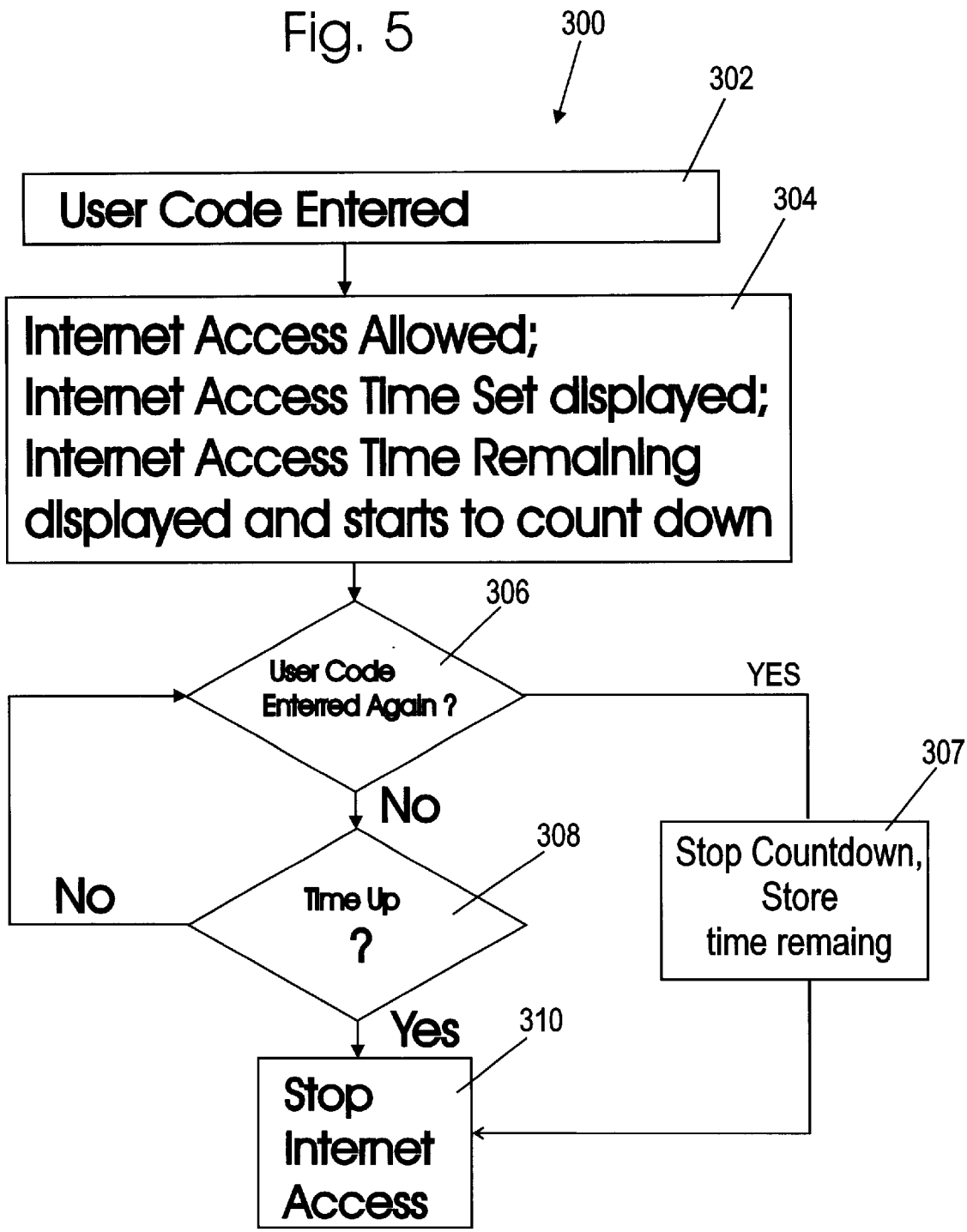
FIG. 5 shows a flow chart of a method for limiting a user's access to the Internet.

FIG. 5 shows a flow chart 300 of a method for limiting a user's access to the Internet. At step 302 a user code is entered. For example, a code "123" may be entered by pressing keys 106a, 106b, and 106c and then enter in sequence and in order. Code "123" may be the code for the second user, for example. At step 304, Internet access is allowed by Internet access device 20. The Internet access device 20 and/or its processor 104 shown in FIG. 2, may include a relay, such as a programmable relay. The relay may be placed in an internet access allowed state where the relay provides an electrical connection, between communications lines 23a and 21a or in an internet access not allowed state where the relay does not provide electrical connection between communications lines 23a and 21a.

The Internet access time set is displayed on display 100a, such as for example twenty minutes. For example, the second user may have twenty minutes to use the Internet on for example a Monday. The Internet access time remaining is also displayed on display 100b and immediately begins to count down from the initial twenty minutes. In FIG. 3, the time remaining displayed is "10 minutes" meaning that the user has been on the Internet for ten minutes on the particular day.

At step 306 of the flow chart 300 of FIG. 5, the processor 104 of the internet access device 20 determines if the user has entered his or her user code into interactive device 106, for a second time. If the user enters the access code for a second time, then the time remaining countdown is stopped and the time remaining is stored at step 307. The device 20 at step 310 also terminates access to the Internet. The time remaining amount can be stored as a residual time in memory 102 of the Internet access device 20. If the user attempts to access the internet again on the same day, he or she will have only the residual time remaining allowed to access the internet.

If the user does not enter his or her user code again, the processor 104 of the internet access device 20 determines if the time allowed for accessing the internet has expired. If the time has expired, access to the internet is stopped at step 310. If the time for accessing the Internet has not expired then the processor 104 loops back to step 306. This loop is repeated until the time is expired or until the user ends the Internet session by entering his or her user code again.

Figure 6:
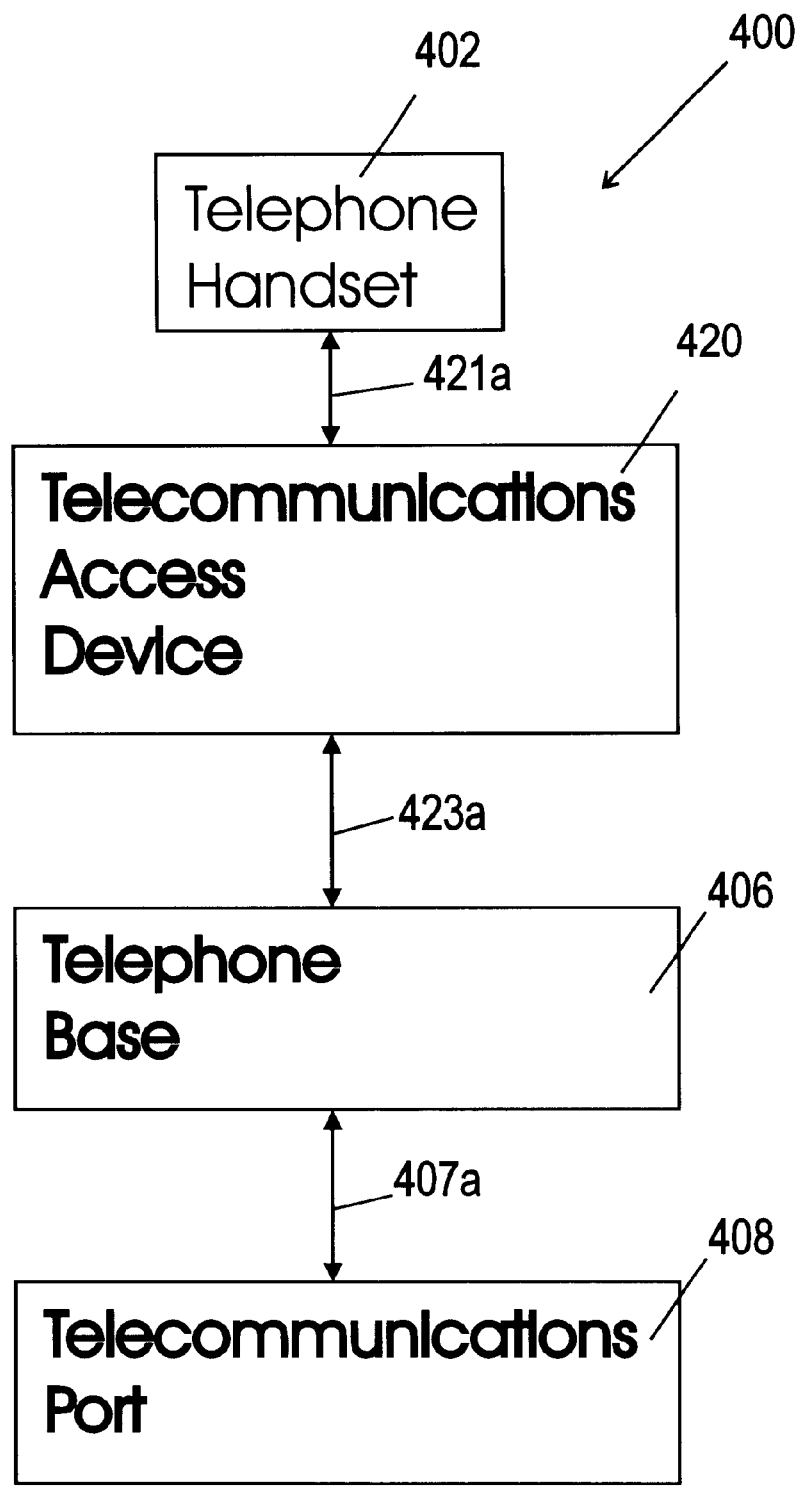
FIG. 6 shows a block diagram of an apparatus in accordance with a second embodiment of the present invention.

FIG. 6 shows a block diagram of an apparatus 400 in accordance with a second embodiment of the present invention. The apparatus 400 includes a telephone handset 402, a telecommunications access device 420, a telephone base 406 and a telecommunications port 408. The telephone handset 402 may be electrically connected and/or may communicate with telecommunications access device 420 via communications line or link 421a. The telecommunications access device 420 may be electrically connected and/or may communicate with telephone base 406 via communications line or link 423a. The telephone base 406 may be electrically connected and/or may communicate with telecommunications port 408 via communications line or link 407a. The communications lines or links 421a, 423a, 407a may be any type of communications links. The telecommunications port 408 may be a wall phone jack. The communications lines or links 421 and 423a may each be a telephone cord, such as ten foot telephone cords.

Figure 7:
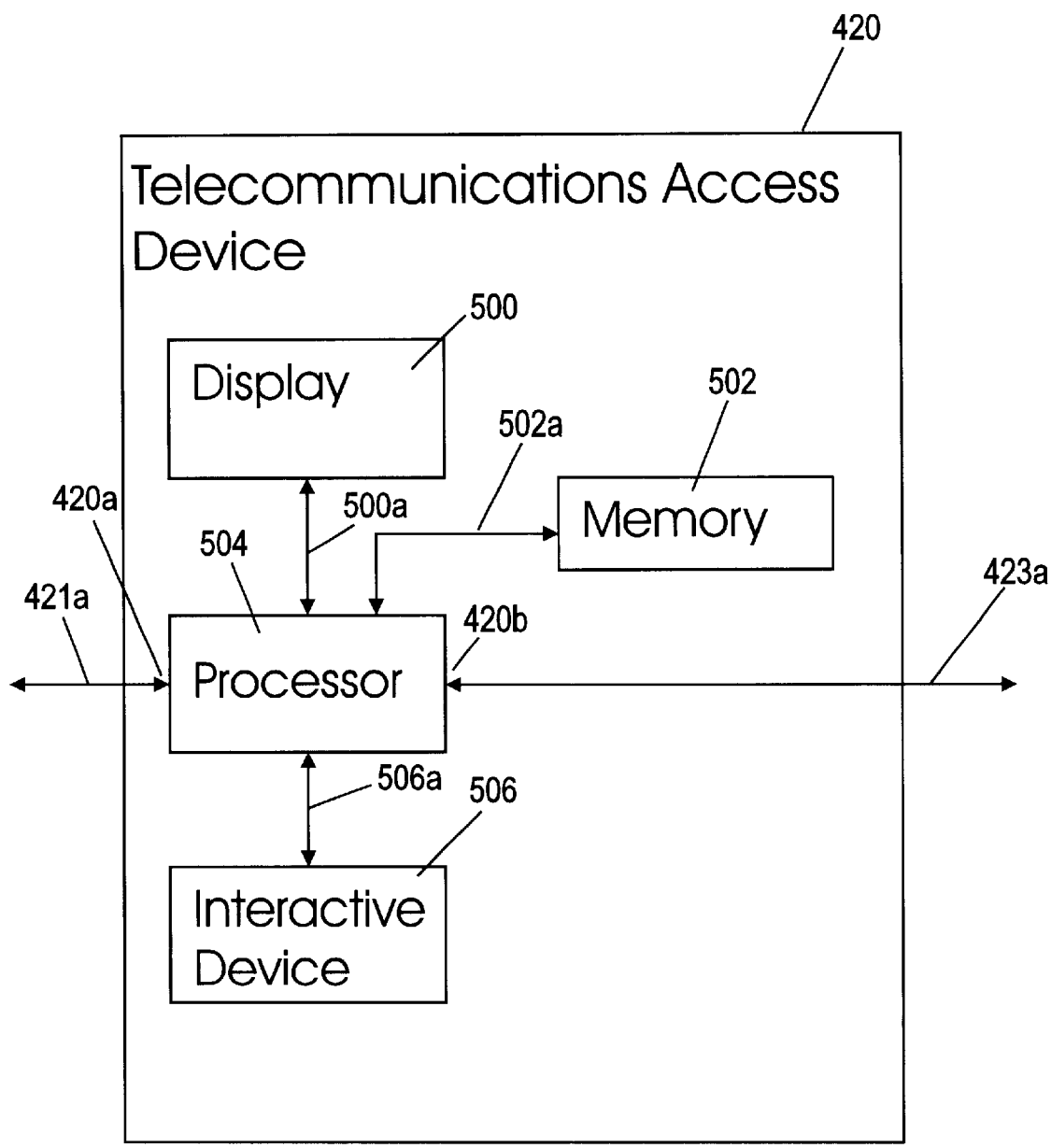
FIG. 7 shows a block diagram of a telecommunications access device for use with the apparatus of FIG. 6.

FIG. 7 shows a block diagram of a telecommunications access device 420 for use with the apparatus of FIG. 6. The telecommunications access device 420 may be similar to or identical to the Internet access device 20 of FIGS. 1, 2, and 3. The telecommunications access device may include display 500, memory 502, processor 504, and interactive device 506. The processor 504 may be electrically connected via communications lines or links 500a, 502a, and 506a to display 500, memory 502, and interactive device 506, respectively.

In operation, the telecommunications access device 420 may function similarly to the Internet access device 20. However, for the embodiment of FIG. 6, telephone usage is prevented after a certain amount of time, as opposed to Internet usage.

Figure 8:
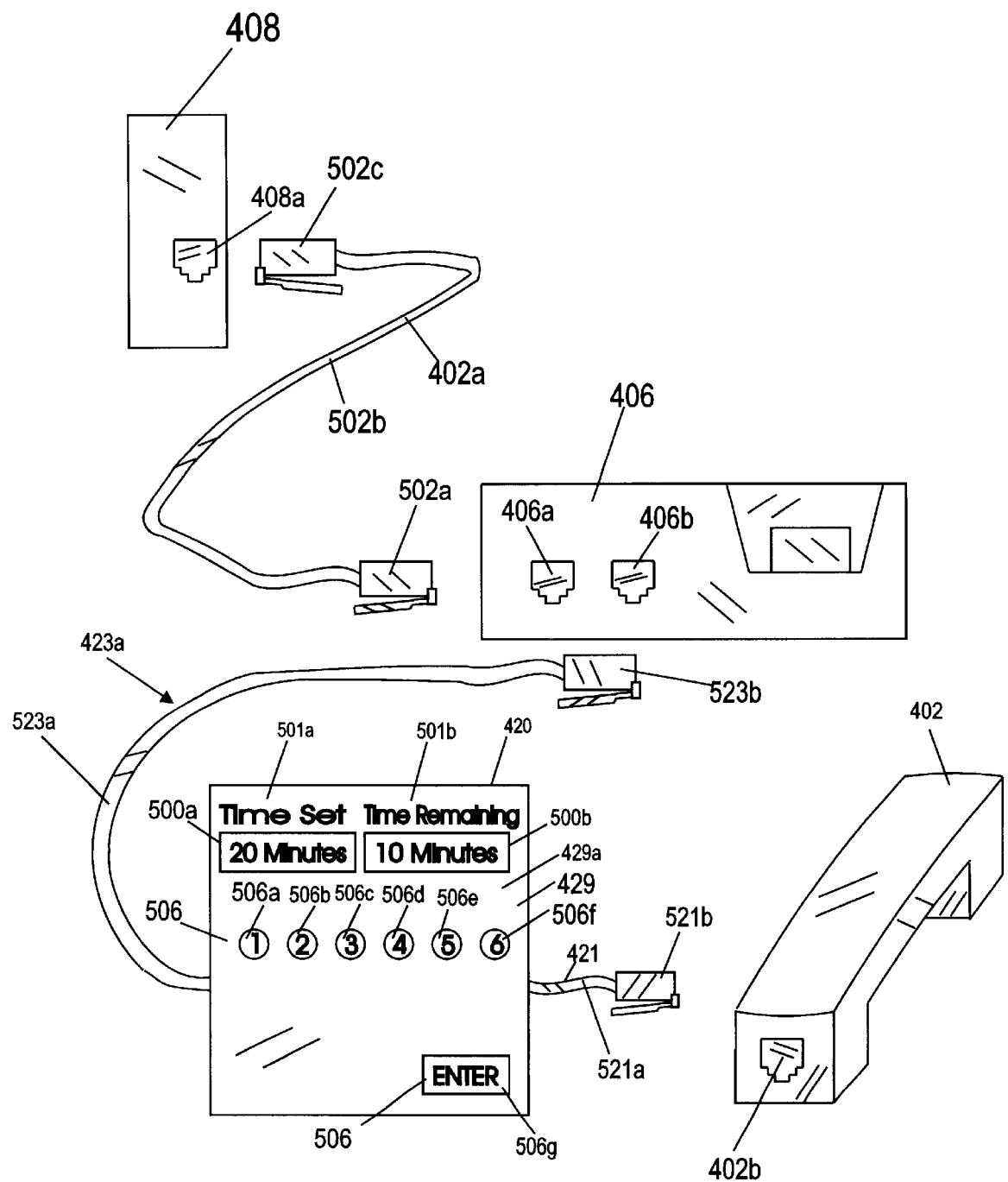
FIG. 8 shows the apparatus of FIG. 6.

FIG. 8 shows the apparatus 400 of FIG. 6 in one embodiment. The FIG. 8 shows a telephone handset 402, a telecommunications access device 420, a telephone base 406, and a telecommunications port or telephone jack 408. FIG. 8 also shows a telecommunications line 402a, which in this example is comprised of a telephone cord 502b terminating at a first end with a plug 502a and another plug 502c.

Telecommunications port 408 has a port 408a into which the plug 502c can be inserted in order to allow the port 408 to electrically communicate with the telecommunications line 402a. The telephone base 406 has a port 406a into which the plug 502a can be inserted in order to allow the telecommunications line 402a to electrically communicate with the telephone base 406.

The telecommunications access device 420 has permanently connected telecommunications lines 421a and 423a. Telecommunications line 421a has a telephone cord 521a, which is electrically connected to a plug 521b. Telecommunications line 423a has a telephone cord, which is electrically connected to a plug 523b. The plug 523b can be inserted into a port 406b of the telephone base 406 in order to allow the telecommunications line 423a to electrically communicate with the telephone base 406. The plug 521b can be inserted into the port 402b in order to allow the telecommunications line 421 to electrically communicate with the handset 402.

FIG. 9 shows portions of the apparatus 10 of FIG. 1 in one embodiment. FIG. 1 shows Internet port device 22 which may be a telephone jack. FIG. 1 also shows Internet access device 20 and computer processor 14.

Internet port device 22 includes a port 22a. Internet access device 20 includes a telecommunications line 23a, which includes a telephone cord 123a and a plug 123b. The plug 123b can be inserted into the port 22a to provide electrical communication between the port 22 and the telecommunications line 23a. The Internet access device 20 also includes a telecommunications line 21a, which includes a telephone cord 121a and a plug 121b. The computer processor 14 includes a port 14a. The plug 121b can be inserted into the plug 14a in order to allow the telecommunication line 121a to communicate electrically with the computer processor 14.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
    a telecommunications access device, which allows an administrator to set an amount of time per day that a user can access a main telecommunications line;
    wherein the telecommunications access device is permanently electrically connected to first and second telecommunications lines; and wherein
    the first telecommunications line is comprised of a first telephone cord and a first plug, wherein the first plug is adaptable for insertion into a telecommunications port of a computer processor; and
    the second telecommunications line is comprised of a second telephone cord and a second plug, wherein the second plug is adaptable for insertion into a port of a telephone jack, which is electrically connected to the main telecommunications line.

2. The apparatus of claim 1 wherein
    the telecommunications access device includes a keypad, which allows the user to enter a user code, which permits the user to access the main telecommunications line if the amount of time has not expired.

3. The apparatus of claim 1 wherein
    the telecommunications access device includes a display, which dynamically displays the amount of time that the user has remaining to access the main telecommunications line for a particular day.

4. The apparatus of claim 1 wherein
    the telecommunications access device includes a display, which displays the amount of time per day that the user has to access the main telecommunications line.

5. The apparatus of claim 1 wherein the
    the amount of time per day that the user can access the main telecommunications line determines an amount of time per day that the user can access the Internet.

6. A method comprising the steps of:
    setting an amount of time per day that a user can access the main telecommunications line,
    wherein the amount of time per day is set via a telecommunications access device that is permanently electrically connected to first and second telecommunication lines;
    wherein the first telecommunications line is comprised of a first telephone cord and a first plug, wherein the first plug is adaptable for insertion into a telecommunications port of a computer processor; and the second telecommunications line is comprised of a second telephone cord and a second plug, wherein the second plug is adaptable for insertion into a port of a telephone jack, which is electrically connected to the main telecommunications line.

7. The method of claim 6 wherein the telecommunications access device includes a keypad, which allows the user to enter a user code, which permits the user to access the telecommunications line if the amount of time has not expired.

8. The method of claim 6 further comprising dynamically displaying the amount of time that the user has remaining to access the telecommunications line for a particular day.

9. The method of claim 6 further comprising displaying the amount of time per day that the user has to access the telecommunications line.

10. An apparatus comprising a telecommunications access device, which allows an administrator to set an amount of time per day that a user can access a main telecommunications line;

wherein the telecommunications access device is permanently electrically connected to first and second telecommunications lines; and wherein the first telecommunications line is comprised of a first telephone cord and a first plug, wherein the first plug is adaptable for insertion into a port of a telephone base; and the second telecommunications line is comprised of a second telephone cord and a second plug, wherein the second plug is adaptable for insertion into a port of a telephone handset.

11. An apparatus comprising a telecommunications access device, which allows an administrator to set an amount of time per day that a user can access a main telecommunications line; and further comprising a telephone base;

a telephone handset; and wherein the telecommunications access device is interposed between the telephone base and the telephone handset such that the telecommunications access device determines whether communication takes place between the telephone base and the telephone handset.

12. The apparatus of claim 11 wherein the first telecommunications line is comprised of a first telephone cord and a first plug, wherein the first plug is adaptable for insertion into a port of the telephone base; and the second telecommunications line is comprised of a second telephone cord and a second plug, wherein the second plug is adaptable for insertion into a port of the telephone handset.

13. An apparatus comprising a telecommunications access device, which allows an administrator to set an amount of time per day that a user can access a main telecommunications line;

a computer processor;

a telephone jack; and wherein the telecommunications access device is interposed between the computer processor and the telephone jack such that the telecommunications access device determines whether communication takes place between the telephone jack and the computer processor; and wherein the first telecommunications line is comprised of a first telephone cord and a first plug, wherein the first plug is adaptable for insertion into a telecommunications port of the computer processor; and the second telecommunications line is comprised of a second telephone cord and a second plug, wherein the second plug is adaptable for insertion into a port of the telephone jack.

\* \* \* \* \*